United States Patent
Ikai

(10) Patent No.: US 9,257,932 B2
(45) Date of Patent: Feb. 9, 2016

(54) CONTROL DEVICE FOR SERVOMOTOR

(71) Applicant: FANUC CORPORATION, Yamanashi (JP)

(72) Inventor: Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 134 days.

(21) Appl. No.: 14/195,754

(22) Filed: Mar. 3, 2014

(65) Prior Publication Data

US 2014/0253010 A1  Sep. 11, 2014

(30) Foreign Application Priority Data

Mar. 5, 2013 (JP) .................................. 2013-042983

(51) Int. Cl.
*H02P 25/02* (2006.01)

(52) U.S. Cl.
CPC ............ *H02P 25/02* (2013.01); *H02P 2205/01* (2013.01)

(58) Field of Classification Search
CPC ....................................................... H02P 25/02
USPC ................................................. 318/560, 632
See application file for complete search history.

(56) References Cited

U.S. PATENT DOCUMENTS

| | | | | |
|---|---|---|---|---|
| 5,093,609 | A * | 3/1992 | Sakamoto ........... | H02P 23/0045 318/561 |
| 6,310,457 | B1 | 10/2001 | Iwashita et al. | |
| 6,822,415 | B1 * | 11/2004 | Komiya .............. | H02P 29/0038 318/560 |
| 8,040,098 | B2 * | 10/2011 | Zhang ................... | G05B 11/42 318/560 |
| 8,378,615 | B2 * | 2/2013 | Tazawa ..................... | H02P 6/10 318/560 |
| 2001/0002097 | A1 * | 5/2001 | Tsutsui .................... | G05B 5/01 318/560 |
| 2003/0147062 | A1 * | 8/2003 | Morisada ................ | G03F 7/709 355/72 |
| 2003/0184251 | A1 * | 10/2003 | Oyama ................... | H02P 29/00 318/607 |
| 2004/0135536 | A1 | 7/2004 | Iwashita et al. | |
| 2008/0180052 | A1 * | 7/2008 | Iwashita ................ | G05B 19/19 318/615 |
| 2010/0194327 | A1 | 8/2010 | Komiya et al. | |
| 2013/0214718 | A1 * | 8/2013 | Ikeda ...................... | G05B 11/42 318/609 |
| 2013/0346460 | A1 * | 12/2013 | Bruneau ................ | G05B 11/42 708/300 |
| 2014/0253010 | A1 * | 9/2014 | Ikai ......................... | H02P 25/02 318/632 |
| 2014/0285791 | A1 * | 9/2014 | Hayakawa .......... | G03F 7/70733 355/76 |

FOREIGN PATENT DOCUMENTS

| | | |
|---|---|---|
| CN | 1448816 A | 10/2003 |
| CN | 101236436 A | 8/2008 |
| JP | 6178570 A | 6/1994 |
| JP | 3628199 B2 | 3/2005 |
| WO | 2009019953 A1 | 2/2009 |

\* cited by examiner

*Primary Examiner* — Kawing Chan
(74) *Attorney, Agent, or Firm* — Hauptman Ham, LLP

(57) ABSTRACT

A control device of a servomotor includes a current control loop selecting unit configured to select a first current control loop or a second current control loop having a response speed slower than that of the first current control loop, as a current control loop for controlling a current flowing through the servomotor; a filter configured to attenuate an input or an output of the first current control loop or the second current control loop selected by the current control loop selecting unit in accordance with a set attenuation ratio in a specific frequency range; and a filter attenuation ratio setting unit configured to set, as the attenuation ratio of the filter, a first attenuation ratio when the first current control loop is selected by the current control loop selecting unit, and a second attenuation ratio smaller than the first attenuation ratio when the second current control loop is selected.

5 Claims, 4 Drawing Sheets

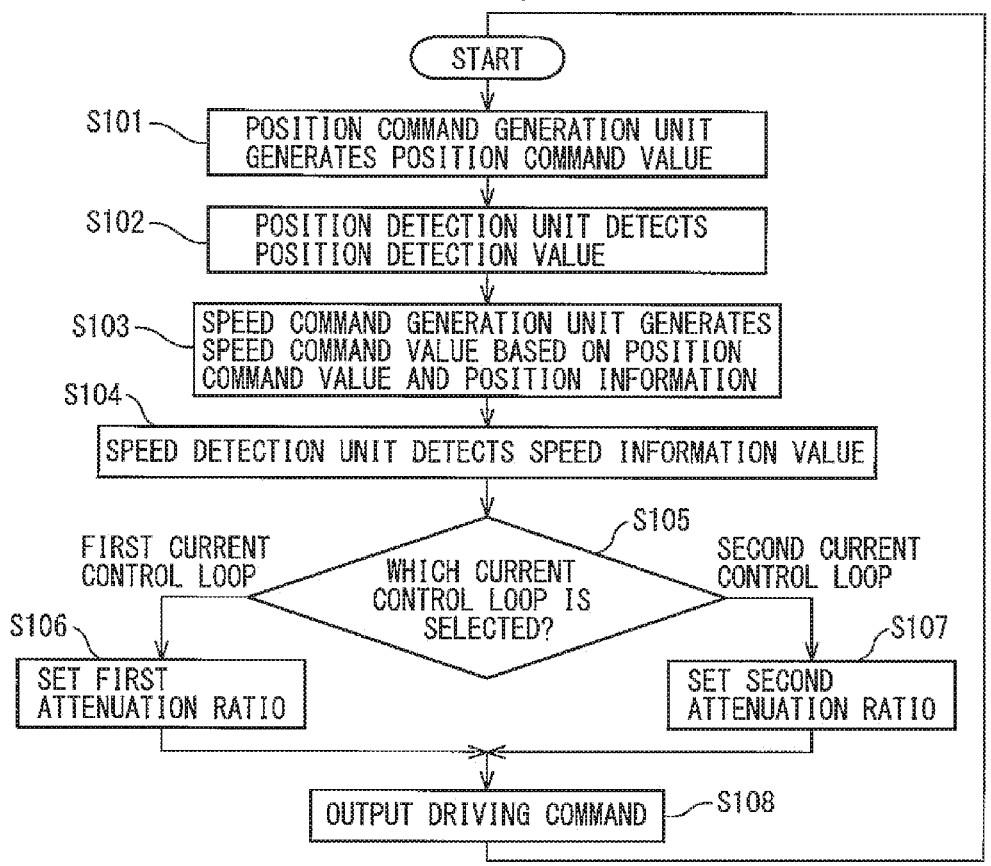
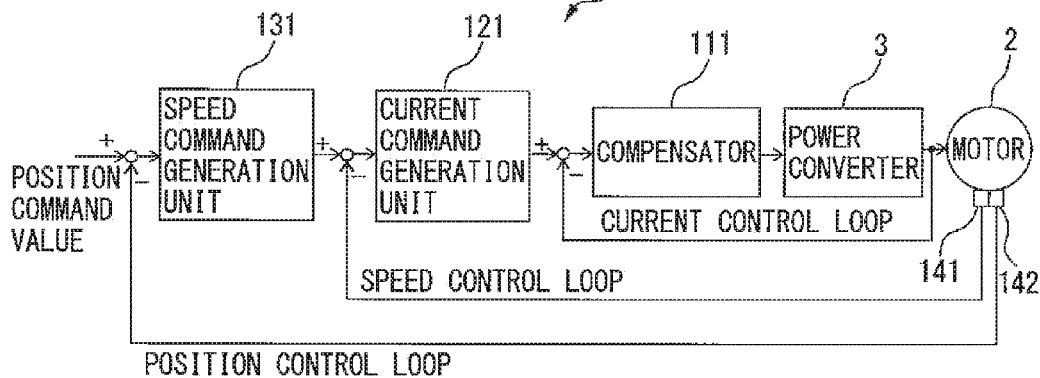

CONTROL DEVICE FOR SERVOMOTOR

RELATED APPLICATIONS

The present application claims priority to Japanese Application Number 2013-042983, filed Mar. 5, 2013, the disclosure of which is hereby incorporated by reference herein in its entirety.

BACKGROUND ART

1. Field of the Invention

The present invention relates to a control device for a servomotor used as a driving source of a machine tool.

2. Description of the Related Art

It is often the case that a control device for controlling and driving a servomotor used as a driving source of a machine tool is generally constituted of three control loops, namely, a position control loop, a speed control loop, and a current control loop.

FIG. 7 is a block diagram schematically illustrating a configuration of a general control device for a servomotor. In the following, constituent elements indicated with the same reference numerals throughout the drawings are constituent elements having substantially the same functions.

In a position control loop, a speed command generation unit 131 generates a speed command value, based on position information of a servomotor 2 detected by a position detection unit 142 mounted on the servomotor 2 and based on a position command value generated by a position command generation unit (not illustrated). In a speed control loop, a current command generation unit 121 generates a current command value, based on speed information of the servomotor 2 detected by a speed detection unit 141 mounted on the servomotor 2 and based on a speed command value generated by the speed command generation unit 131. In a current control loop, a driving command for driving a power converter 3 using a compensator 111 is generated, based on a detection value of a driving current of the servomotor 2 and based on the current command value generated by the current command generation unit 121. The power converter 3 is an inverter configured to convert direct current power to alternate current power by a switching operation of a switching element provided in the power converter 3, for instance. The power converter 3 is configured to control a conversion operation of converting direct current power to alternate current power for driving the servomotor 2 by controlling a switching operation of the switching element in the power converter 3 in response to receiving a driving command. The servomotor 2 is operated by using alternate current power output from the power converter 3, as a driving power. Therefore, controlling the alternate current power output from the power converter 3 makes it possible to control and drive the speed of the servomotor 2, the torque of the servomotor 2, or the position of a rotor. A movable unit of a machine tool is driven by driving the servomotor 2.

As a compensator used in a current control loop, a PI compensator, and an I-P compensator are known.

A PI compensator has an advantage in shortening a rise time compared to an I-P compensator. Generally, a shortened rise time of a current control loop makes it possible to set a high gain of a speed control loop formed on the outside of the current control loop. Further, setting a high gain of a speed control loop makes it possible to reduce an error (position error) with respect to a position command value in a machine tool. PI control and I-P control have the same oscillation limit. Therefore, when a current control loop gain is determined with a margin substantially the same as each other from the oscillation limit with respect to a PI compensator and with respect to an I-P compensator, PI control can be operated at a higher speed, and a position error of PI control can be reduced, as compared with I-P control. Accordingly, using a PI compensator in a current control loop contributes to enhancement of cutting precision of a machine tool.

On the other hand, an I-P compensator has an advantage in reducing an amount overshooting of a machine tool compared to a PI compensator. Therefore, using an I-P compensator in a current control loop makes it possible to stably position with a reduced amount of overshooting in a machine tool.

For instance, as disclosed in U.S. Pat. No. 3,628,199, there is a technique that enhances both the response and stability in servomotor control by appropriately using a PI compensator and an I-P compensator, as a compensator in a current control loop, taking into account of the aforementioned characteristics of the PI compensator and the I-P compensator. According to the invention disclosed in U.S. Pat. No. 3,628,199, gain values of a current control loop and a speed control loop are adjusted, as necessary, by respectively using an I-P compensator in positioning mode (non-locus control mode) such as a fast forward operation, and a PI compensator in locus control mode such as cutting and feeding operation mode, as a compensator in a current control loop. Specifically, securing a high gain by using a PI compensator in locus control mode makes it possible to enhance response of a current control loop, and also makes it possible to enhance response of speed control and position control to thereby enhance cutting processing precision of a machine tool while enhancing control performance. Further, securing a low gain by using an I-P compensator in non-locus control mode makes it possible to stably secure control.

In the invention disclosed in U.S. Pat. No. 3,628,199, only the compensators are switched depending on whether the servomotor is in locus control mode or in non-locus control mode. For instance, when the driving mode of the servomotor is switched from non-locus control mode to locus control mode, the compensator to be used in a current control loop is switched from an I-P compensator to a PI compensator. In this case, although response of the current control loop enhances, a gain at a mechanical resonance point increases in a high frequency range. Specifically, when a PI compensator is used in a current control loop, a gain in a high frequency range increases compared to a configuration of using an I-P compensator. As a result, vibrations that are not generated when using an I-P compensator may be generated when using a PI compensator.

The invention disclosed in U.S. Pat. No. 3,628,199 has an object of enhancing control performance by using a PI compensator in locus control mode to thereby enhance processing precision of a machine tool, but does not consider the response characteristics in a high frequency range, and does not take any measures against avoiding resonance when using a PI compensator in a current control loop in locus control mode. In other words, the invention disclosed in U.S. Pat. No. 3,628,199 appears to be made based on the premise that a machine has no mechanical resonance point. Actually, however, an elastic body with a mass has a natural frequency. Therefore, a machine without a mechanical resonance point does not exist.

As has been described above, according to the invention disclosed in U.S. Pat. No. 3,628,199, although use of a PI compensator in a current control loop remarkably enhances response to thereby enhance processing precision of a machine tool, stability of control performance of the machine tool may be deteriorated.

SUMMARY OF THE INVENTION

In consideration of the above problem, an object of the present invention is to provide a control device for a servomotor that makes it possible to enhance control response and to secure control stability.

To accomplish the above object, a control device for a servomotor for driving a machine tool is provided with a current control loop selecting unit configured to select a first current control loop or a second current control loop having a response speed slower than that of the first current control loop, as a current control loop to be used in controlling a current flowing through the servomotor based on an input current command value; a filter configured to attenuate an input or an output of the first current control loop or the second current control loop selected by the current control loop selecting unit in accordance with a set attenuation ratio in a specific frequency range; and a filter attenuation ratio setting unit configured to set, as the attenuation ratio of the filter, a first attenuation ratio when the first current control loop is selected by the current control loop selecting unit, and a second attenuation ratio smaller than the first attenuation ratio when the second current control loop is selected.

In the above configuration, a compensator to be provided in the first current control loop may be a PI compensator, and a compensator to be provided in the second current control loop may be an I-P compensator.

Further, a current control loop gain of the first current control loop may be set to a value larger than that of a current control loop gain of the second current control loop.

Further, the first attenuation ratio and the second attenuation ratio may be set so that a gain to be obtained from an input and an output of a circuit constituted of the first current control loop and the filter having the first attenuation ratio corresponding thereto, and a gain to be obtained from an input and an output of a circuit constituted of the second current control loop and the filter having the second attenuation ratio corresponding thereto are substantially equal to each other in a specific frequency range.

Further, the control device for the servomotor may be further provided with a speed command generation unit configured to generate a speed command value of the servomotor; a speed detection unit configured to detect speed information of the servomotor; and a current command generation unit configured to generate the current command value, based on the speed command value generated by the speed command generation unit and based on the speed information detected by the speed detection unit.

Further, the control device for the servomotor may be further provided with a position command generation unit configured to generate a position command value of the servomotor; and a position detection unit configured to detect position information of the servomotor. In the above configuration, the speed command generation unit may generate the speed command value, based on the position command value generated by the position command generation unit and based on the position information detected by the position detection unit.

BRIEF DESCRIPTION OF THE DRAWINGS

The present invention will be more clearly understood with reference to the following accompanying drawings:

FIG. 6 is a flowchart illustrating an operation to be performed by the control device for the servomotor; and FIG. 7 is a block diagram schematically illustrating a configuration of a general control device for a servomotor.

DETAILED DESCRIPTION

In the following, a control device for a servomotor is described with reference to the drawings. It should be noted, however, that the present invention is not limited to the drawings or the embodiment described in the following.

Figure 1:
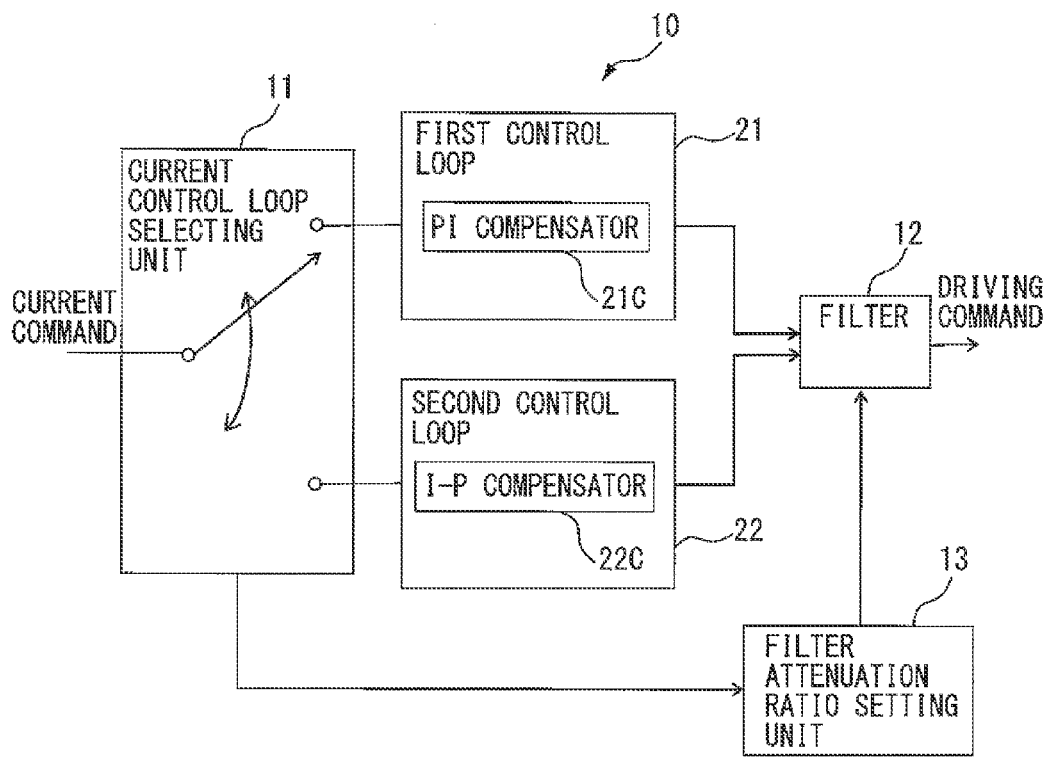
FIG. 1 is a principle block diagram illustrating a current control unit in a control device for a servomotor.
Figure 2:
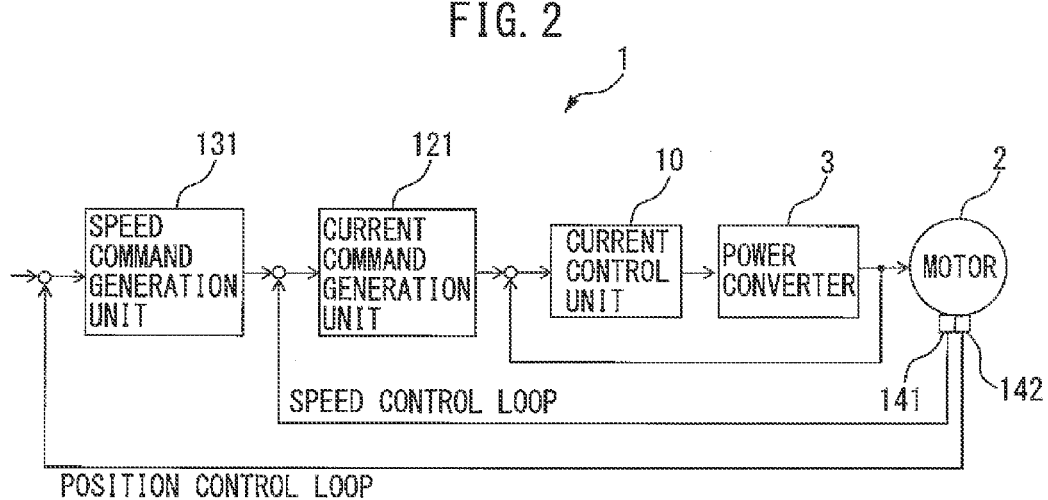
FIG. 2 is a block diagram schematically illustrating a configuration of the control device for the servomotor.

FIG. 1 is a principle block diagram illustrating a current control unit in a control device for a servomotor. FIG. 2 is a block diagram schematically illustrating a configuration of the control device for the servomotor.

As illustrated in FIG. 2, a control device 1 of a servomotor 2 for driving a machine tool is provided with a current control unit 10, a current command generation unit 121, and a speed command generation unit 131. The control device 1 is configured to generate a driving command for controlling and driving a power converter 3 so that the power converter 3 outputs alternate current power as a driving power of the servomotor 2. The power converter 3 is, for instance, an inverter configured to convert direct current power to alternate current power by a switching operation of a switching element provided in the power converter 3. The power converter 3 is configured to control a conversion operation of converting direct current power to alternate current power for driving the servomotor 2 by controlling a switching operation of the switching element in the power converter 3 in response to receiving a driving command. The servomotor 2 is operated by using alternate current power output from the power converter 3, as a driving power. Thus, controlling the alternate current power output from the power converter 3 makes it possible to control and drive the speed of the servomotor 2, the torque of the servomotor 2, or the position of a rotor. A movable unit of the machine tool is driven by driving the servomotor 2.

The control device 1 of the servomotor 2 is provided with a position command generation unit (not illustrated) configured to generate a position command value with respect to a rotor of the servomotor 2; a position detection unit 142 configured to detect position information of the servomotor 2; a speed command generation unit 131 configured to generate a speed command value, based on the position command value generated by the position command generation unit and based on the position information detected by the position detection unit 142; a speed detection unit 141 configured to detect speed information of the servomotor 2; and a current command generation unit 121 configured to generate a current command value, based on the speed command value generated by the speed command generation unit 131 and based on the speed information detected by the speed detection unit 141. Examples of the speed information to be detected by the speed detection unit 141 are a rotational speed and an angular velocity of the rotor of the servomotor 2. Examples of the position information to be detected by the position detection unit 142 are a rotational angle and a rotational displacement of the rotor of the servomotor 2.

As illustrated in FIG. 1, the current control unit 10 is provided with a current control loop selecting unit 11, a filter 12, and a filter attenuation ratio setting unit 13.

The current control loop selecting unit 11 selects a first current control loop 21, or a second current control loop 22 having a response speed slower than that of the first current control loop 21, as a current control loop to be used in controlling a current flowing through the servomotor 2 based on an input current command value. The current control loop selecting unit 11 is designed in advance to perform a selection operation of selecting the first current control loop 21 provided with a PI compensator 21C in locus control mode such as cutting and feeding operation mode, or selecting the second current control loop 22 provided with an I-P compensator 22C in positioning mode (non-locus control mode) such as a fast forward operation, as a compensator in a current control loop. The PI compensator 21C has an advantage in having higher control response compared to the I-P compensator 22C, whereby cutting processing precision of a machine tool can be enhanced. Further, the I-P compensator 22C has an advantage in reducing the overshooting amount of a machine tool compared to the PI compensator 21C. Thus, a current control loop is selected in order to utilize advantages in both the PI compensator 21C and the I-P compensator 22C. Specifically, a proportional action and an integral action of a speed loop are performed with a relatively low integral gain and proportional gain in non locus control mode such as a fast forward operation, and a speed loop control is performed with a relatively high integral gain and proportional gain in a locus control mode operation. The value of each of the gains is stored in advance in a RAM, for instance. The current control unit 10 is configured to read a corresponding gain value from the RAM, and sets the read value in accordance with a mode.

The filter 12 attenuates an input or an output of the first current control loop 21 or the second current control loop 22 selected by the current control loop selecting unit 11 in accordance with a set attenuation ratio in a specific frequency range. Specifically, when the filter 12 is disposed at a preceding stage of the first current control loop 21 and the second current control loop 22, the filter 12 attenuates the input of the first current control loop 21 or the second current control loop 22 selected by the current control loop selecting unit 11 in accordance with a set attenuation ratio in a specific frequency range. Alternatively, when the filter 12 is disposed at a latter stage of the first current control loop 21 and the second current control loop 22, the filter 12 attenuates the output of the first current control loop 21 or the second current control loop 22 selected by the current control loop selecting unit 11 in accordance with a set attenuation ratio in a specific frequency range. In the example illustrated in FIG. 1, the filter 12 is disposed at a latter stage of the first current control loop 21 and the second current control loop 22. Examples of the filter 12 are a band elimination filter (a notch filter) and a low frequency pass filter (a low-pass filter).

The filter attenuation ratio setting unit 13 sets, as the attenuation ratio of the filter 12, a first attenuation ratio when the first current control loop 21 is selected by the current control loop selecting unit 11, and sets a second attenuation ratio smaller than the first attenuation ratio when the second current control loop 22 is selected.

Next, setting of an attenuation ratio of the filter 12 by the filter attenuation ratio setting unit 13 is described with an example, in which the servomotor 2 is a synchronous motor.

Figure 3:
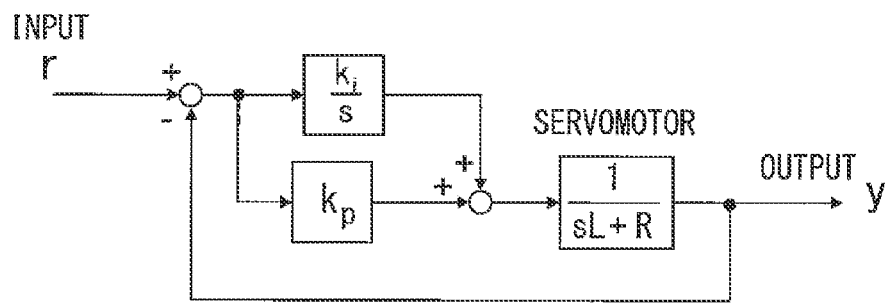
FIG. 3 is a block diagram illustrating a case, in which the servomotor is controlled and driven, using a first current control loop provided with a PI compensator.
Figure 4:
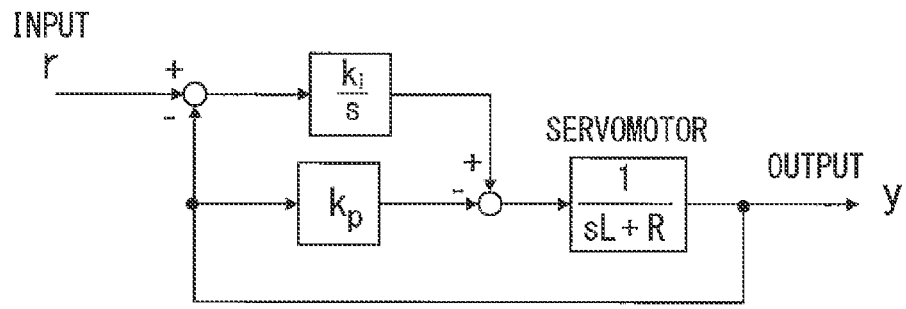
FIG. 4 is a block diagram illustrating a case, in which the servomotor is controlled and driven, using a second current control loop provided with an I-P compensator.

A compensator provided in the first current control loop 21 is the PI compensator 21C, and a compensator provided in the second current control loop 22 is the I-P compensator 22C. FIG. 3 is a block diagram illustrating a case, in which the servomotor is controlled and driven, using a first current control loop provided with a PI compensator. FIG. 4 is a block diagram illustrating a case, in which the servomotor is controlled and driven, using a second current control loop provided with an I-P compensator.

As has been described above, the PI compensator 21C can make a rise time shorter compared to the I-P compensator 22C, to thereby operate the servomotor 2 at a high speed. The PI compensator 21C has a larger gain in a high frequency range compared to the I-P compensator 22C. Therefore, the current control loop gain of the first current control loop 21 provided with the PI compensator 21C is set to a value larger than that of the current control loop gain of the second current control loop 22 provided with the I-P compensator 22C.

The characteristics of the servomotor 2 as a synchronous motor are determined by a winding resistance R and an inductance L which are electric constants. Referring to FIG. 3 illustrating a case in which the servomotor 2 is controlled and driven by using the first current control loop 21 provided with the P-I compensator 21C, a transfer function $G_{PI}(s)$ from input r to output y is expressed by formula (1). In formula (1), $k_p$ is a proportional gain, and $k_i$ is an integral gain.

$$G_{PI}(s) = \frac{k_p s + k_i}{Ls^2 + (R+k_p)s + k_i} = \frac{(1+s/\omega_0)\omega_n^2}{s^2 + 2\zeta\omega_n s + \omega_n^2} \quad (1)$$

where $$\omega_n \equiv \sqrt{\frac{k_i}{L}} \quad \zeta = \frac{R+k_p}{2L}\sqrt{\frac{k_i}{L}} \quad \omega_0 \equiv \frac{k_i}{k_p}$$

In formula (1), assuming that $s=j\omega$, formula (2) is obtained.

$$G_{PI}(j\omega) = \frac{(1+j\omega/\omega_n)\omega_n^2}{-\omega^2 + 2j\zeta\omega_n\omega + \omega_n^2} \quad (2)$$

$$= \frac{(1+j\omega/\omega_n)\omega_n^2}{(\omega_n^2 - \omega^2) + j2\zeta\omega_n\omega}$$

$$= \frac{(1+j\omega/\omega_n)}{(1-\omega^2/\omega_n^2) + j2\zeta\omega/\omega_n}$$

Expressing formula (2) by normalized angular frequency η yields formula (3).

$$G_{PI}(j\eta) = \frac{1+j\eta(\omega_n/\omega_0)}{(1-\eta^2)+j2\zeta\eta} \quad (3)$$

where normalized angular frequency $$\eta \equiv \frac{\omega}{\omega_n}$$

The frequency characteristics of the gain in PI control are obtained and expressed by formula (4) by calculating the absolute value of formula (3). From formula (4), it is obvious that the characteristics of PI control are determined only by the constants ζ, $\omega_n$, and $\omega_0$.

$$|G_{PI}(j\omega)| = \sqrt{\frac{1+\eta^2(\omega_n/\omega_0)^2}{(1-\eta^2)^2+(2\zeta\eta)^2}} \quad (4)$$

Transforming formula (4) in the unit of decibel yields formula (5).

$$20\log|G_{PI}(j\eta)| = 10\log[1+\eta^2(\omega_n/\omega_0)^2] - 10\log[(1-\eta^2)^2+(2\zeta\eta)^2][dB] \quad (5)$$

On the other hand, referring to FIG. 4 illustrating a case in which the servomotor 2 is controlled and driven by using the second current control loop 22 provided with the I-P compensator 22C, the transfer function $G_{I-P}(s)$ from input r to output y is expressed by formula (6). In formula (6), $k_p$ is a proportional gain, and $k_i$ is an integral gain.

$$G_{I-P}(s) = \frac{k_i}{Ls^2+(R+k_p)s+k_i} = \frac{\omega_n^2}{s^2+2\zeta\omega_n s+\omega_n^2} \quad (6)$$

In formula (6), assuming that $s=j\omega$, formula (7) is obtained.

$$|G_{I-P}(j\omega)| = \frac{\omega_n^2}{-\omega^2+2j\zeta\omega_n\omega+\omega_n^2} \quad (7)$$
$$= \frac{\omega_n^2}{(\omega_n^2-\omega^2)+j2\zeta\omega_n\omega}$$
$$= \frac{1}{(1-\omega^2/\omega_n^2)+j2\zeta\omega/\omega_n}$$

Expressing formula (7) by normalized angular frequency η yields formula (8).

$$G_{I-P}(j\eta) = \frac{1}{(1-\eta^2)+j2\zeta\eta} \quad (8)$$

The frequency characteristics of the gain in I-P control are obtained and expressed by formula (9) by calculating the absolute value of formula (8). From formula (9), it is obvious that the characteristics of I-P control are determined only by the constant ζ.

$$|G_{I-P}(j\eta)| = \frac{1}{\sqrt{(1-\eta^2)^2+(2\zeta\eta)^2}} \quad (9)$$

Transforming formula (9) in the unit of decibel yields formula (10).

$$20\log|G_{I-P}(j\eta)| = -10\log[(1-\eta^2)^2+(2\zeta\eta)^2][dB] \quad (10)$$

A change in gain in switching a current control loop to be used in controlling a current flowing through the servomotor 2 based on an input current command value, from the second current control loop 22 provided with the I-P compensator 22C to the first current control loop 21 provided with the PI compensator 21C, is obtained by calculating a difference between formula (5) and formula (10), and is expressed by formula (11).

$$20\log|G_{PI}(j\omega)| - 20\log|G_{I-P}(j\omega)| = 10\log[1+\eta^2(\omega_n/\omega_0)^2][dB] \quad (11)$$

Figure 5:
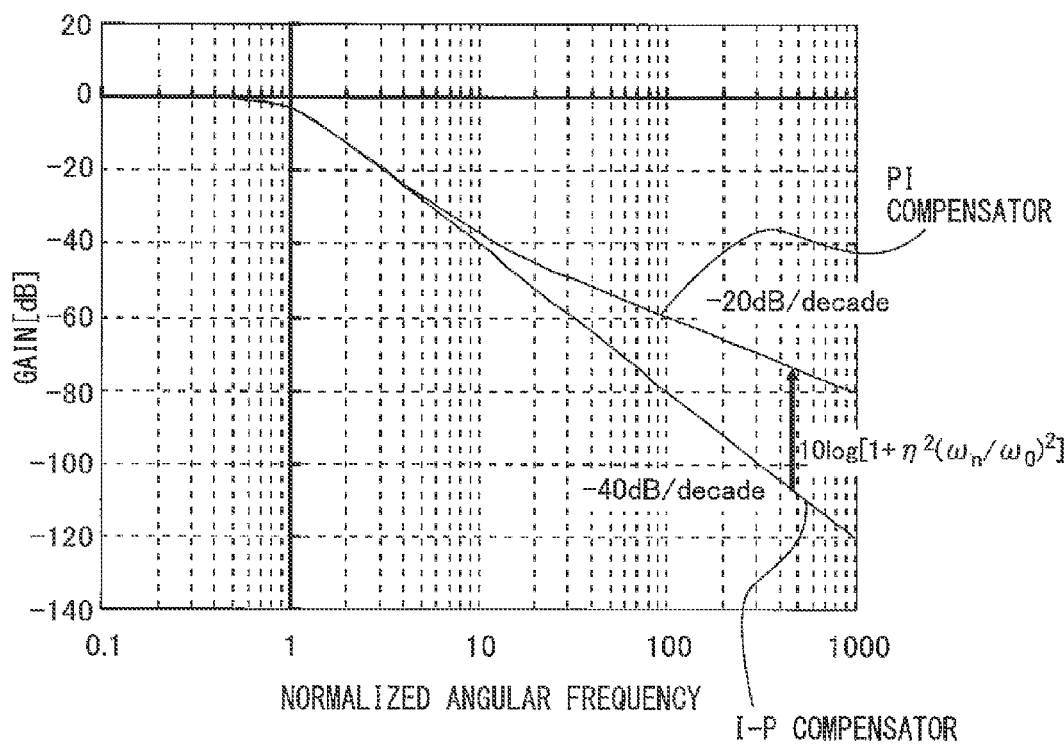
FIG. 5 is a gain diagram for describing a difference of frequency characteristics between a PI compensator and an I-P compensator.

FIG. 5 is a gain diagram for describing a difference of frequency characteristics between a PI compensator and an I-P compensator. Expressing formula (11) by the gain diagram of FIG. 5 obtains a gradient of −20 dB/decade in the PI compensator, and obtains a gradient of −40 dB/decade in the I-P compensator. As illustrated in FIG. 5, a gain difference between the PI compensator and the I-P compensator is great in a high frequency range. This means that switching from the first current control loop 21 provided with the PI compensator 21C to the second current control loop 22 provided with the I-P compensator 22C results in a sharp change in the gain of a control system. In view of the above, the attenuation ratio of the filter 12 is changed, as the compensator is switched as described below in order to stabilize the control system.

Specifically, the filter attenuation ratio setting unit 13 sets a first attenuation ratio when the first current control loop 21 is selected by the current control loop selecting unit 11, and sets a second attenuation ratio smaller than the first attenuation ratio when the second current control loop 22 is selected in order to avoid lowering of response in a high frequency range, and to avoid deterioration of control performance. More specifically, the first attenuation ratio and the second attenuation ratio are set so that a gain to be obtained from an input and an output of a circuit constituted of the first current control loop 21 and the filter 12 provided with the first attenuation ratio corresponding thereto, and a gain to be obtained from an input and an output of a circuit constituted of the second current control loop 22 and the filter 12 provided with the second attenuation ratio corresponding thereto are substantially equal to each other in a specific frequency range. Specifically, when the first current control loop 21 provided with the PI compensator 21C is selected, the attenuation ratio of the filter 12 is set to increase by an amount corresponding to $10\log\{1+\eta^2(\omega_n/\omega_0)^2\}[dB]$ in a frequency component corresponding to resonance, as compared with a configuration, in which the second current control loop 22 provided with the I-P compensator 22C is selected. The above configuration makes it possible to maintain control stability before and after switching of the compensator. Specifically, as illustrated in the gain diagram of FIG. 5, the gradient of the gain in the PI compensator 21C and the gradient of the gain in the I-P compensator 22C differ from each other. Therefore, the filter attenuation ratio is switched so as to compensate for the gradient difference.

FIG. 6 is a flowchart illustrating an operation to be performed by the control device for the servomotor.

In Step S101, the position command generation unit generates a position command value.

In Step S102, the position detection unit 142 detects position information of the rotor of the servomotor 2.

In Step S103, the speed command generation unit 131 generates a speed command value, based on the position command value generated by the position command generation unit and based on the position information detected by the position detection unit 142.

In Step S104, the speed detection unit 141 detects speed information of the servomotor 2.

In Step S105, the current control unit 10 determines whether the first current control loop 21 or the second current control loop 22 is selected by the current control loop selecting unit 11, as a current control loop to be used in controlling a current flowing through the servomotor 2 based on an input current command value. The current control loop selecting unit 11 is designed in advance to perform a selection operation of selecting the first current control loop 21 provided with the PI compensator 21C in locus control mode such as cutting and feeding operation mode, or selecting the second current control loop 22 provided with the I-P compensator 22C in positioning mode (non-locus control mode) such as a fast forward operation, as a compensator in the current control loop. In Step S105, when it is determined that the first current control loop 21 is selected, the process proceeds to Step S106, and when it is determined that the second current control loop 22 is selected, the process proceeds to Step S107.

In Step S106, the filter attenuation ratio setting unit 13 sets the attenuation ratio of the filter 12 to the first attenuation ratio corresponding to the selected first current control loop 21. Subsequently, in Step S107, the filter attenuation ratio setting unit 13 sets the attenuation ratio of the filter to the second attenuation ratio corresponding to the selected second current control loop 22. The second attenuation ratio is a value smaller than the value of the first attenuation ratio. As has been described above, the first attenuation ratio and the second attenuation ratio are respectively set so that a gain to be obtained from an input and an output of a circuit constituted of the first current control loop 21 and the filter 12 provided with the first attenuation ratio corresponding thereto, and a gain to be obtained from an input and an output of a circuit constituted of the second current control loop 22 and the filter 12 provided with the second attenuation ratio corresponding thereto are substantially equal to each other in a specific frequency range.

In Step S108, the current control unit 10 generates a driving command for controlling and driving the power converter 3 so as to output alternate current power as a driving power of the servomotor 2, based on the output from a selected circuit, out of the circuit constituted of the first current control loop 21 and the filter 12 provided with the first attenuation ratio corresponding thereto, and the circuit constituted of the second current control loop 22 and the filter 12 provided with the second attenuation ratio corresponding thereto. The power converter 3 controls a switching operation of the switching element in the power converter 3 in response to receiving a driving command, and outputs, to the servomotor 2, alternate current power necessary for controlling the servomotor 2 at an intended speed, with an intended torque, or at an intended position of the rotor.

The present invention is applicable to a control device for a servomotor to be used as a driving source of a machine tool.

According to the invention, the attenuation ratio of a filter for attenuating an input or an output of a current control loop in a specific frequency range is changed depending on whether the compensator provided in a current control loop of the control device for the servomotor is a PI compensator or an I-P compensator. Therefore, the configuration of the invention makes it possible to enhance control response and to secure control stability.

A PI compensator has an advantage of higher control response compared to an I-P compensator, whereby cutting processing precision of a machine tool can be enhanced. Further, an I-P compensator has an advantage in reducing the overshooting amount of a machine tool compared to a PI compensator. In the present invention, the attenuation ratio of the filter is changed in switching a compensator to be used in a current control loop so as to utilize advantages in both the PI compensator and the I-P compensator. In using the PI compensator, a gain in a high frequency range may increase compared to the I-P compensator. However, in the present invention, the attenuation ratio of the filter is changed as necessary so that the gain of an input and an output of a circuit constituted of a current control loop and a filter, and the gain of an input and an output of another circuit constituted of a current control loop and a filter are substantially equal to each other in a specific frequency range before and after switching between the PI compensator and the I-P compensator. This makes it possible to avoid resonance and to secure control stability.

The invention disclosed in U.S. Pat. No. 3,628,199 has an object to enhance response of current control, and also to enhance response of speed control and position control by changing a compensator to be used in a current control loop in locus control mode from an I-P compensator to a PI compensator. The above publication, however, does not consider avoiding resonance, which may be generated by a change in gain between before and after switching between the PI compensator and the I-P compensator. In contrast, according to the present invention, the filter characteristics are automatically changed in accordance with switching between the PI compensator and the I-P compensator. Therefore, not only response of current control, and response of speed control and position control can be enhanced, but also stability of a control system can be enhanced.

What is claimed is:

1. A control device of a servomotor for driving a machine tool, comprising:
   a current control loop selecting unit configured to select a first current control loop or a second current control loop having a response speed slower than that of the first current control loop, as a current control loop to be used in controlling a current flowing through the servomotor based on an input current command value;
   a filter configured to attenuate an input or an output of the first current control loop or the second current control loop selected by the current control loop selecting unit in accordance with a set attenuation ratio in a specific frequency range; and
   a filter attenuation ratio setting unit configured to set, as the attenuation ratio of the filter, a first attenuation ratio when the first current control loop is selected by the current control loop selecting unit, and a second attenuation ratio smaller than the first attenuation ratio when the second current control loop is selected, wherein
   a compensator provided in the first current control loop is a PI compensator, and a compensator provided in the second current control loop is an I-P compensator.

2. The control device of the servomotor according to claim 1, wherein
   a current control loop gain of the first current control loop is set to a value larger than that of a current control loop gain of the second current control loop.

3. The control device of the servomotor according to claim 1, wherein
   the first attenuation ratio and the second attenuation ratio are set so that a gain to be obtained from an input and an output of a circuit constituted of the first current control loop and the filter having the first attenuation ratio corresponding thereto, and a gain to be obtained from an input and an output of a circuit constituted of the second current control loop and the filter having the second attenuation ratio corresponding thereto are substantially equal to each other in a specific frequency range.

4. The control device of the servomotor according to claim 1, further comprising:
   a speed command generation unit configured to generate a speed command value of the servomotor;
   a speed detection unit configured to detect speed information of the servomotor; and
   a current command generation unit configured to generate the current command value, based on the speed command value generated by the speed command generation unit and based on the speed information detected by the speed detection unit.

5. The control device of the servomotor according to claim 4, further comprising:
a position command generation unit configured to generate a position command value of the servomotor; and
a position detection unit configured to detect position information of the servomotor, wherein
the speed command generation unit generates the speed command value, based on the position command value generated by the position command generation unit and based on the position information detected by the position detection unit.

* * * * *